United States Patent [19]
Sato

[11] Patent Number: 5,202,643

[45] Date of Patent: Apr. 13, 1993

[54] DEMODULATOR FOR DEMODULATING A π/4-SHIFT DQPSK SIGNAL

[75] Inventor: Teruo Sato, Kanagawa, Japan

[73] Assignee: Sony Corporation, Tokyo, Japan

[21] Appl. No.: 854,364

[22] Filed: Mar. 19, 1992

[30] Foreign Application Priority Data

Mar. 20, 1991 [JP] Japan .................................. 3-081412
Mar. 20, 1991 [JP] Japan .................................. 3-081413

[51] Int. Cl.$^5$ .......................... H03D 3/00; H03K 9/04
[52] U.S. Cl. ..................................... 329/309; 329/310; 375/82; 375/85
[58] Field of Search ............... 329/304, 306, 307, 308, 329/309, 310; 375/56, 80, 81, 82, 84, 85

[56] References Cited

U.S. PATENT DOCUMENTS 5,128,967  7/1992  Durkin et al. ................... 329/304 X Primary Examiner—David Mis
Attorney, Agent, or Firm—Philip M. Shaw, Jr.

[57] ABSTRACT

The present invention is directed to a differential phase-shift keying (PSK) signal demodulator in which an error rate provided when a signal modulated according to a π/4-shift DQPSK modulation system is demodulated can be improved. The differential PSK signal demodulator of the present invention includes means for phase-shifting a phase of a detection reference axis by a predetermined angle each in the counter-clockwise direction in synchronism with a timing at which a symbol to be detected is supplied, wherein the modulated signal is synchronizing-detected such that a rotation angle of the symbol and an angle of a detection reference axis are inhibited from becoming equal to each other, thereby a zero level being prevented from being output as a demodulated output. According to another aspect of the present invention, the differential PSK signal demodulator includes means for judging changing traces of signal points from outputs of an I-axis level discriminating device and a Q-axis level discriminating device to select an optimum path, thus making it possible to reduce a bit error rate (BER).

6 Claims, 4 Drawing Sheets

DEMODULATOR FOR DEMODULATING A π/4-SHIFT DQPSK SIGNAL

BACKGROUND OF THE INVENTION

1. Field of the Invention

The present invention generally relates to digital demodulators and, more particularly, to a demodulator for demodulating a π/4-shift DQPSK (differential quadrature-phase-shift keying) signal.

2. Description of the Prior Art

A wide variety of digital modulation systems has been proposed so far (see Japanese Published Patent Publication No. 59-16456). In a digital cellular system now examined in the U.S.A. and Japan, the employment of the π/4-shift DQPSK system is already determined.

In the case of the π/4-shift DQPSK system, the occupied frequency band width thereof is the same as compared with that of the ordinary DQPSK and a fluctuation of a modulated wave is small. Accordingly, the π/4-shift DQPSK is advantageous for a power amplifier operable in a linear fashion. However, if the π/4-shift DQPSK signal is demodulated similarly to the conventional DQPSK signal, there is then the disadvantage such that an error rate is deteriorated.

FIG. 1 of the accompanying drawings shows the location of signal points corresponding to 2-bit data of the conventional DQPSK signal. In this case, a carriers having a phase parallel to an I axis or Q axis is employed as a carrier used in the demodulation.

Assuming now that the carrier phase is equal to an axis OI, then a detection level of $(+a/2^{\frac{1}{2}}, +a/2^{\frac{1}{2}})$ is obtained at a point $P_1$. Accordingly, if this detection output is added to an I-axis discriminator and a Q-axis discriminator, then a discriminated output of $(I=+, Q=+)$ is obtained so that a receiving signal (e.g., 00) can be demodulated.

The above demodulation is also true in the π/4-shift DQPSK modulation system. An essential point of this π/4-shift DQPSK modulation system will be described with reference to FIGS. 2 and 3.

FIG. 2 is a block diagram schematically showing an arrangement of the π/4-shift DQPSK modulation system. As shown in FIG. 2, in the π/4-shift DQPSK modulation system, original serial data, i.e., 2-bit signals $X_k$, $Y_k$ transferred in series are converted into parallel signals by a serial-to-parallel (S/P) converter circuit 30 and these signals are supplied to a differential QPSK modulating circuit 29 which then produces phase-shifted signals $I_k$, $Q_k$.

In such π/4-shift DQPSK modulation system, a modulated wave $M_k$ at time $t=kT$ (T is a duration of symbol) is expressed by the following equation (1):

$$M_k = M_{k-1} \cdot e^{j\Delta\phi(X_k, Y_k)} \quad (1)$$

Thus, the modulated wave $M_k$ can be expressed in the form of a complex number. The phase shift amount $\Delta\phi$ is determined by the 2-bit signals $X_k$ and $Y_k$ as shown on the following table 1.

TABLE 1

| $X_k$ | $Y_k$ | $\Delta\phi$ |
|---|---|---|
| 1 | 1 | $-\frac{3}{4}\pi$ |
| 0 | 1 | $+\frac{3}{4}\pi$ |
| 0 | 0 | $+\frac{1}{4}\pi$ |
| 1 | 1 | $-\frac{1}{4}\pi$ |

Accordingly, the signal points of the π/4-shift DQPSK wave are expressed as shown in a signal point transition diagram forming FIG. 3. More specifically, let us assume that a signal point exists on a point $P_1$ at time of, for example, $t=(k-1)T$.

(1) If $(X_k=1, Y_k=1)$, then a signal point is moved to $P_6$;
(2) If $(X_k=0, Y_k=1)$, then a signal point is moved to $P_4$;
(3) If $(X_k=0, Y_k=0)$, then a signal point is moved to $P_2$; and
(4) If $(X_k=1, Y_k=0)$, then a signal point is moved to $P_8$.

If $(X_k=0, Y_k=0)$, then a signal point is moved to $P_2$. Next, at the timing point of $t=(k+1)$, (1) If $(X_{k+1}=1, Y_{k+1}=1)$, then a signal point is moved from $P_2$ to $P_7$;
(2) If $(X_{k+1}=0, Y_{k+1}=1)$, then a signal point is moved from $P_2$ to $P_7$;
(3) If $(X_{k+1}=0, Y_{k+1}=0)$, then a signal point is moved from $P_2$ to $P_3$; and
(4) If $(X_{k+1}=1, Y_{k+1}=0)$, then a signal point is moved from $P_2$ to $P_1$. Signal points will hereinafter be moved similarly as described above.

When the signal modulated according to the DQPSK modulation system is demodulated, if a carrier having the same phase as that of, for example, an axis $OP_1$ is employed as a demodulation reference axis, $(+a, 0)$ is output as a demodulated output. When this demodulated output is supplied to an I-axis discriminator or Q-axis discriminator, in the reception condition in which a carrier-to-noise (C/N) ratio is low, there is a large possibility that the detector may derive an output $(I=+, Q=-)$ or $(I=+, Q=+)$, resulting in an error. As a consequence, an error rate of data is considerably deteriorated.

However, the π/4-shift DQPSK modulation system might be considered as a DQPSK system in which the reference phase axis is rotated by 45 degrees each in the counter-clockwise direction in synchronism with the transmission time of symbol because the phase is shifted by π/4 at (0, 0). As a consequence, when the signal modulated according to the above modulation system is demodulated, if a conventional synchronizing detector in which a phase of a detection reference axis is fixed is utilized, then the above-mentioned disadvantage occurs at every time interval 2T (e.g., when 2-bit data is changed from $P_1$ to $P_2$ and to $P_1$ in that order). There is then the disadvantage that a bit error rate is deteriorated considerably.

OBJECTS AND SUMMARY OF THE INVENTION

Therefore, it is an object of the present invention to provide an improved demodulator for a 45-shift PSK signal in which the aforesaid shortcomings and disadvantages of the prior art can be eliminated. art can be eliminated.

More specifically, it is an object of the present invention to provide a demodulator for a 45-shift PSK signal in which a bit error rate can be improved when a signal modulated according to the π/4-shift DQPSK modulation system is demodulated.

As an aspect of the present invention, a digital demodulator is comprised of a detection signal generating circuit for generating a plurality of detection signals whose phases are shifted by a predetermined angle, a detection signal selecting circuit for selecting one of the plurality of detection signals generated by the above detection signal generating circuit and supplying the signal thus selected to a synchronizing detector as a symbol detecting signal, and a detection reference axis control circuit for controlling the selection operation of the detection signal selecting circuit such that a phase of a detecting signal output from the detection signal selecting circuit is shifted by a predetermined angle in the counter-clockwise direction in synchronism with a timing at which a symbol to be detected is supplied.

In accordance with another aspect of the present invention, a digital demodulator is arranged such that an I-axis output and a Q-axis output from the synchronizing detectors are supplied to a gate circuit so that, when the gate circuit derives a predetermined logic output, the above-mentioned detection reference axis starts being shifted in the counter-clockwise direction.

According to the digital demodulator arranged as described above, since the phase of the detection signal is shifted by the predetermined angle in the counter-clockwise direction in synchronism with the timing at which the symbol detected is supplied, it becomes possible to prevent the rotation angle of the symbol and the angle of the reference axis of the detection signal from becoming coincident with each other. Therefore, the zero level output can be avoided from being output as a demodulated output. which reduces a probability of error in the level detector.

The above and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

Figure 4:
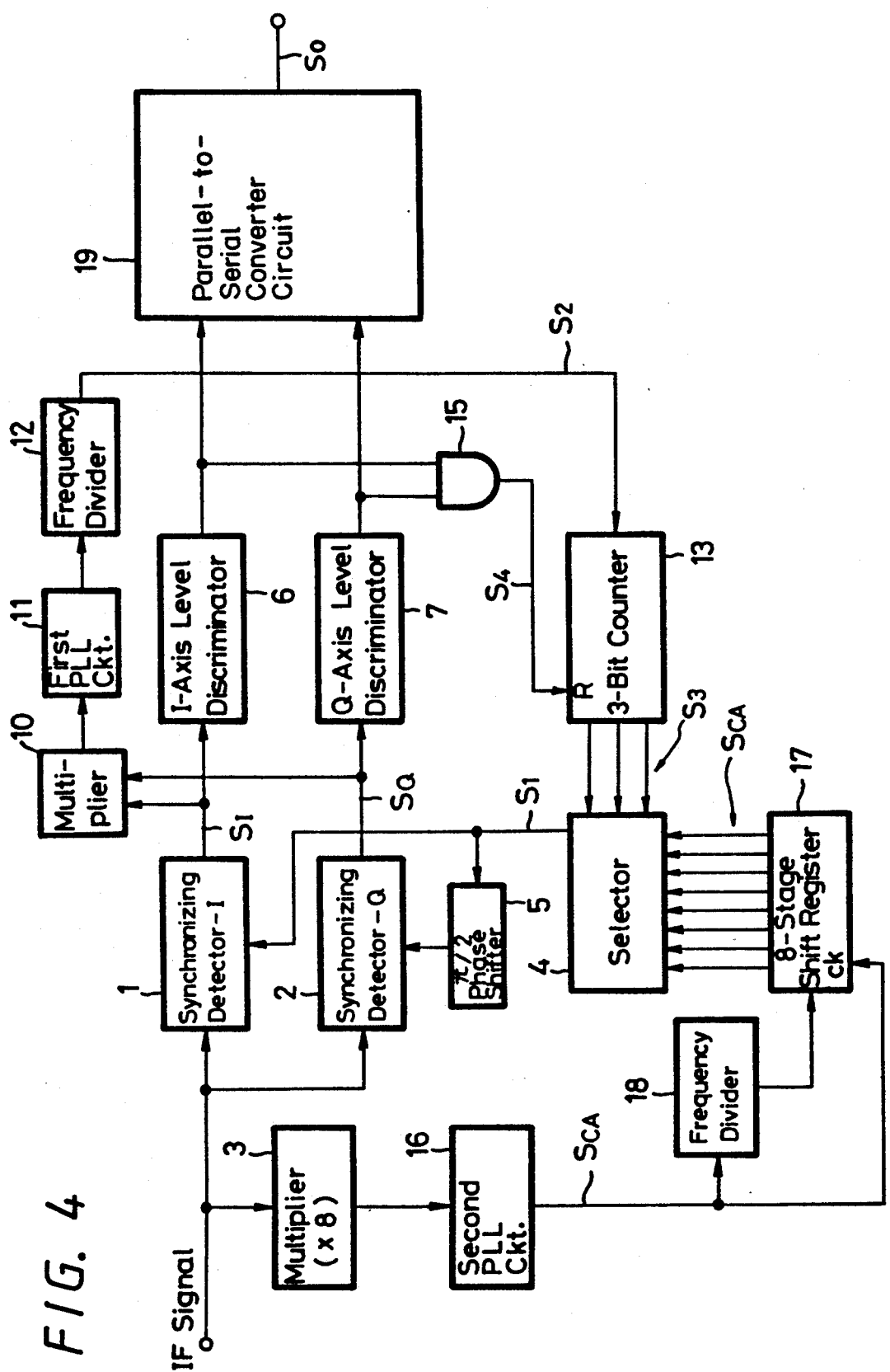
FIG. 4 is a block diagram showing a differential PSK signal demodulator according to a first embodiment of the present invention.

FIG. 4 of the accompanying drawings is a block diagram showing a main portion of a digital demodulator according to an embodiment of the present invention. This digital demodulator is adapted to demodulate a digital signal which is modulated according to the $\pi/4$-shift DQPSK modulation system.

As shown in FIG. 4, a digital demodulator of this embodiment is arranged such that an intermediate frequency (IF) signal supplied from a circuit of the preceding stage (not shown) is supplied to first and second synchronizing detectors 1 and 2 and also supplied to a multiplier 3. The first detector 1 is adapted to detect an input information in the I-axis direction and the second detector 2 is adapted to detect an input information in the Q-axis direction.

The first and second detectors 1 and 2 are supplied with an input information extracting signal $S_1$ from a selector 4. More specifically, the detecting signal $S_1$ is directly supplied to the first detector 1 and is also supplied to the second detector 2 through a $\pi/2$ phase-shifter 5, whereby the input information extracting signals are phase-shifted by $\pi/2$ in the first and second detectors 1 and 2. As will be described later, according to this embodiment, the phase of the detecting signal $S_1$ is rotated in synchronism with a timing at which the 2-bit symbol of the digital signal is transmitted.

A detected output signal $S_I$ from the first detector 1 is supplied to an I-axis level discriminator 6 and a detected output signal $S_Q$ from the second detector 2 is supplied to a Q-axis level discriminator 7. The detected output signals $S_I$ and $S_Q$ of the first and second detectors 1 and 2 are supplied to and multiplied with each other by a multiplier 10.

The multiplier 10 is adapted to generate a symbol detecting timing signal. An output of this multiplier 10 is supplied to a first phase-locked loop (PLL) circuit 11 and an output of the first PLL circuit 11 is supplied to a divide-by 2 circuit 12, thereby a symbol detecting timing signal $S_2$ being generated. That is, a timing of 2T (T is the duration of symbol) is detected by these circuits.

The timing signals $S_2$ from the frequency dividing circuit 12 is supplied to a 3-bit counter 13. This 3-bit counter 13 generates a decode signal $S_3$ that is used to determine the selecting operation of the selector 4 of the next stage. An AND output signal $S_4$ derived from an AND circuit 15 is supplied to a reset terminal R of the 3-bit counter 13.

Figure 1:
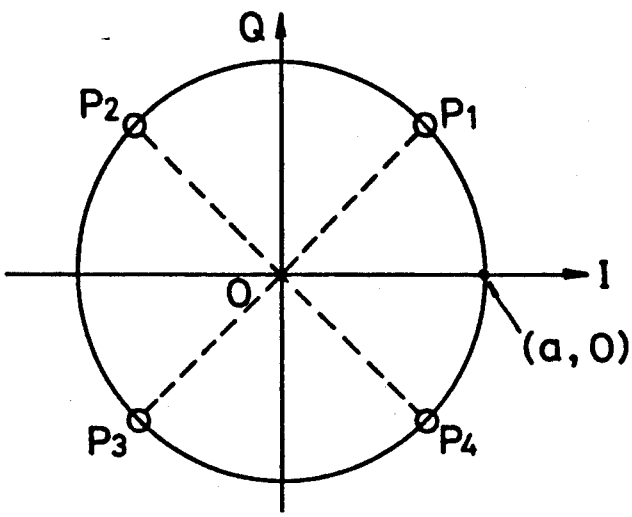
FIG. 1 is a schematic diagram used to explain location of signal points in a DQPSK modulation according to the prior art.
Figure 2:
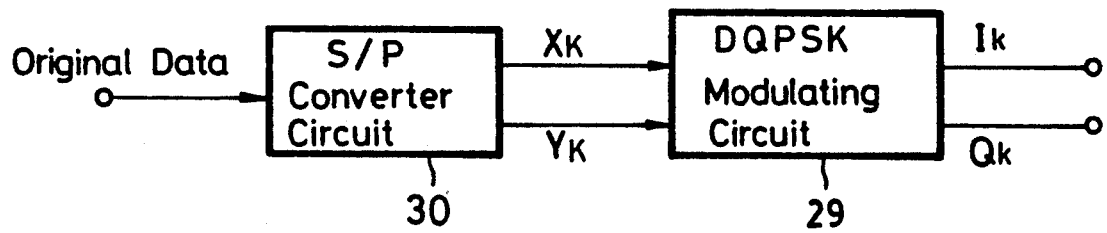
FIG. 2 is a block diagram showing a $\pi/4$-shift DQPSK modulation system according to the prior art.
Figure 3:
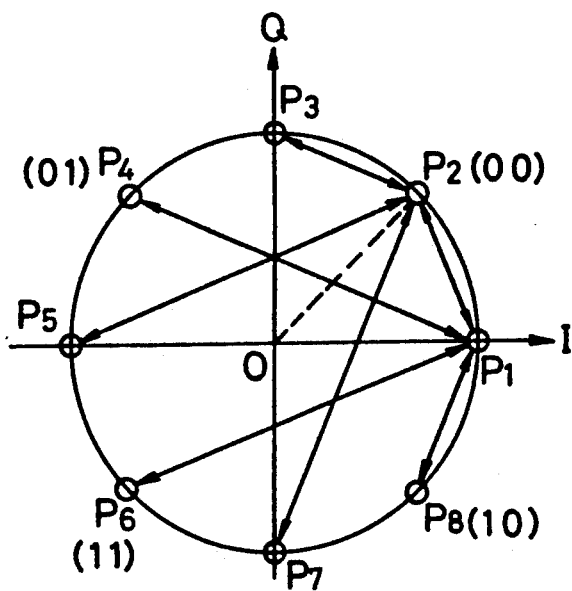
FIG. 3 is a schematic representation used to explain a reference phase shift of a carrier.

The AND circuit 15 is supplied at its input terminals with level detected outputs of the I-axis and Q-axis level discriminators 6 and 7. Thus, when both outputs of these level discriminators 6 and 7 go to high "H" level (e.g., reference phase is 0–I and signal point is $P_2$ in FIG. 3), the 3-bit counter 13 is reset, setting the phase of the decode signal $S_3$ in the initial state.

The IF signal supplied to the multiplier 3 is multiplied with 8 and then fed to a second PLL circuit 16 which then generates a clock signal $S_{Ck}$ synchronized with the input IF signal. The clock signal $S_{Ck}$ is supplied to a clock input terminal ck of a shift register 17 as a clock signal which is used to control a timing of the shift operation. This clock signal $S_{Ck}$ is divided by 8 by a frequency dividing circuit 18 and fed to a signal input terminal of the shift register 17.

The shift register 17 shifts an input signal in 8 stages in synchronism with the clock signal $S_{Ck}$ and outputs a serial input signal in the form of parallel signals. Accordingly, the shift register 17 outputs 8 carrier signals $S_{CA}$ whose phases are shifted by $\pi/4$ each.

These carrier signals $S_{CA}$ are supplied to the above-mentioned selector 4, in which one of them is selected on the basis of the decode signal $S_3$ and fed to the first and second detectors 1 and 2 as the detecting signal $S_1$.

The detecting signal $S_1$ is directly supplied to the first detector 1 which synchronizing-detects a digital signal with reference to the I-axis and also supplied through the $\pi/2$ phase-shifter 5 to the second detector 2 which synchronizing-detects a digital signal with reference to the Q-axis.

According to the synchronizing detections in the first and second detectors 1 and 2, the phases of the symbol detecting reference axes are rotated by 45 degrees each in the counter-clockwise direction in synchronism with the timing signal $S_2$ by which the symbol is transmitted. The detected output signals $S_1$ and $S_Q$ from the first and second detectors 1 and 2 are supplied to the input terminals of the AND circuit 15 as described above and also fed to a parallel-to-serial (i.e., P/S) converter circuit 19.

When the digital demodulator of this embodiment is set in the stationary state, i.e., when the carrier is phase-shifted by 45 degrees each in synchronism with the symbol transmitting timing and the synchronizing demodulation is carried out, then the same processing as that of the ordinary DQPSK is carried out in order to demodulate serial data from the detected symbol.

More specifically, phase rotation angles of signal points at time $t' = (k-1)$ and $t = kT$ are observed and parallel data are converted into serial data in accordance with the following table 2.

TABLE 2

| ΔP | output bit | (2 bits) |
|---|---|---|
| $-\pi$ | 1 | 1 |
| $+\pi/2$ | 0 | 1 |
| 0 | 0 | 0 |
| $-\pi/2$ | 1 | 0 |

In this way, the signal converted to the serial signal by the parallel-to-serial converter circuit 19 is delivered to the external circuit as a demodulator output signal $S_0$.

According to the circuit configuration of the present invention as described above, since the rotational angle of the symbol and the angle of the detection reference axis are prevented from becoming coincident with each other by phase-shifting the phases of the detecting signals by the predetermined angle in the counter-clockwise direction in synchronism with the timing at which the symbol detected is supplied, the zero level output can be prevented from being output as the demodulated output. Therefore, as compared with the synchronizing detector supplied with a carrier whose phase is fixed, the level detector which reproduces serial data can be simplified in circuit configuration, which can make the digital demodulator compact and inexpensive. Furthermore, since the zero level output is prevented from being output as the demodulated output, error detection in the level detector can be avoided, thereby a bit error rate (BER) being improved considerably.

Figure 5:
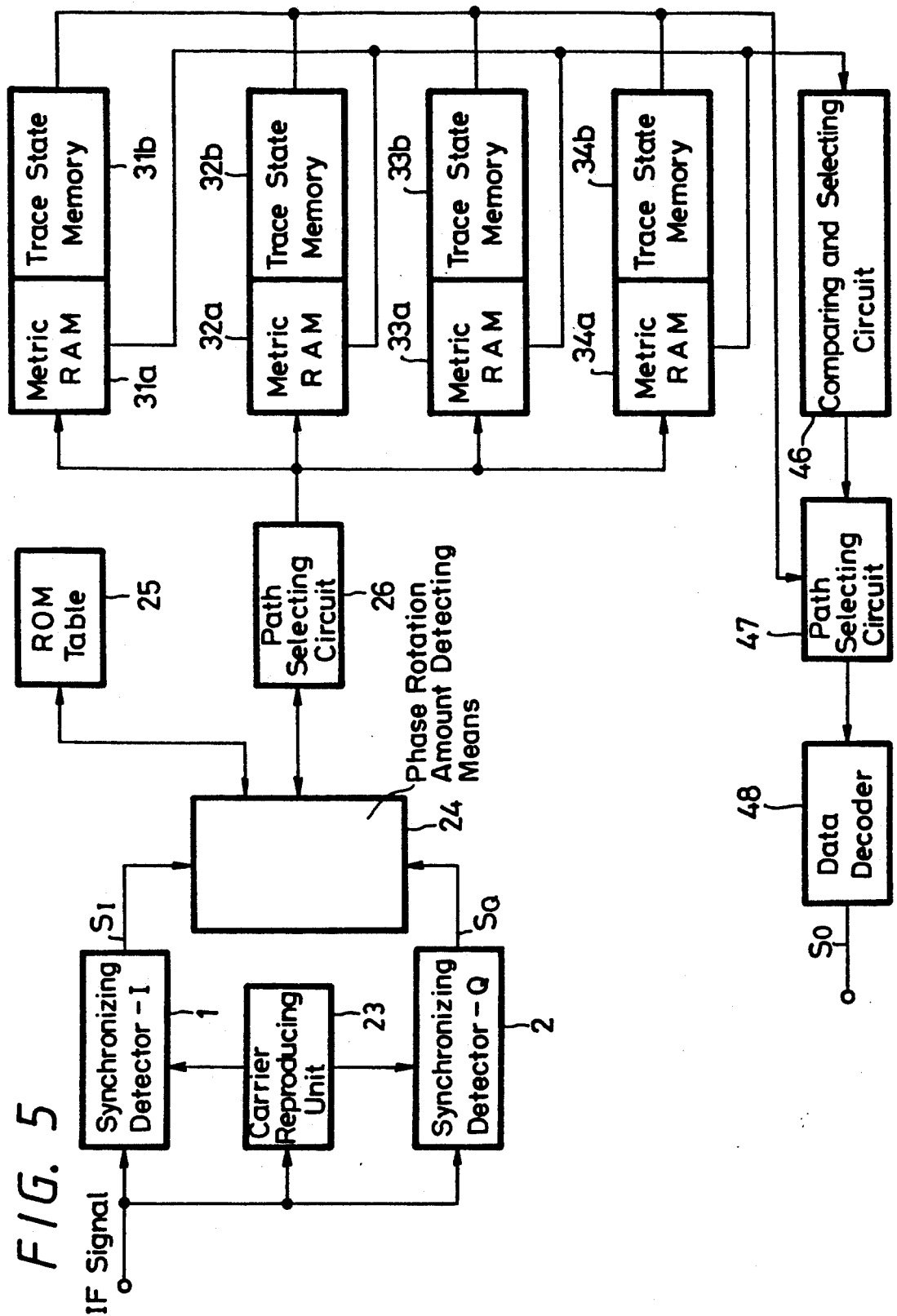
FIG. 5 is a block diagram showing a differential PSK signal demodulator according to a second embodiment of the present invention.

FIG. 5 shows in block form an arrangement of the differential PSK demodulator according to a second embodiment of the present invention. In FIG. 5, like parts corresponding to those of FIG. 4 are marked with the same references and therefore need not be described in detail.

As shown in FIG. 5, in the differential PSK demodulator of this embodiment, a phase rotation amount detecting means 24 is connected to the output terminals of the first and second detectors 1 and 2. The carrier reproducing unit 23 incorporates units 3, 4, 5, 13, 16, 17 and 18 to control the synchronizing detectors 1 and 2 in the manner previously described. A read-only memory (ROM) table 25 is controlled by the phase rotation amount detecting means 24. A first path selecting circuit 26 is adapted to select a changing trace (path) of each signal point. Metric memories 31a through 34a are adapted to store an added value (metric) of likelihood values. Trace state memories 31b through 34b are adapted to store changing traces of respective signal points. By way of example, four trace state memories are provided per four signal points. A comparing and selecting circuit 46 is adapted to compare read-out outputs of the metric memories 31a through 34a with a reference value. Reference numeral 47 depicts a second path selecting circuit and 48 a data decoder.

Referring to FIG. 5, detection outputs $S_1$ and $S_Q$ respectively derived from the first and second detectors 1 and 2 are supplied to the phase rotation amount detecting means 24. The phase rotation amount detecting means 24 detects a phase rotation amount of an input signal on the basis of the input synchronizing detection outputs $S_1$ and $S_Q$ by utilizing the ROM table 5 according to the following process:

(1) Determine whether the detection output $S_1$ of an I channel is positive or negative;
(2) Determine whether the detection output $S_Q$ of a Q channel is positive or negative;
(3) Calculate $\gamma = |Q|/|I|$;
(4) Calculate $\phi = \tan^{-1}(\gamma)$ on the basis of the ROM table 5 where $0 \leq \phi < \pi/2$ (see FIG. 6); and
(5) Determine $-\pi \leq \phi \leq +\pi$ on the basis of positive or negative polarity of I and Q.

Since the modulated signal according to the DQPSK modulation system has four positions to move from a certain signal point to a certain signal point, the above-mentioned process of (1) to (5) is repeated four times.

This process will be described more fully with respect to the DQPSK modulation system, that is, the $\pi/4$ shift DQPSK system, by way of example.

In the DQPSK modulation system, assuming that T represents a a time interval in which the symbol is transmitted, then a phase of modulated wave at a certain timing point t is determined in response to the change of symbol between $t = (n-1)T$ and $t = n \cdot T$. That is, this modulation system might be considered as a kind of convolutional coding systems and might be regarded as a convolutional coding system in which an en coding rate is 1/1 and a constraint length is 3.

A maximum likelihood detection method called a Viterbi algorithm is known as a method of decoding the convolutional code signal. Fundamentally, in this embodiment, the signal modulated according to the $\pi/4$-shift DQPSK modulation system is decoded by using the maximum likelihood detecting method such as the Viterbi algorithm or the like.

Figure 6:
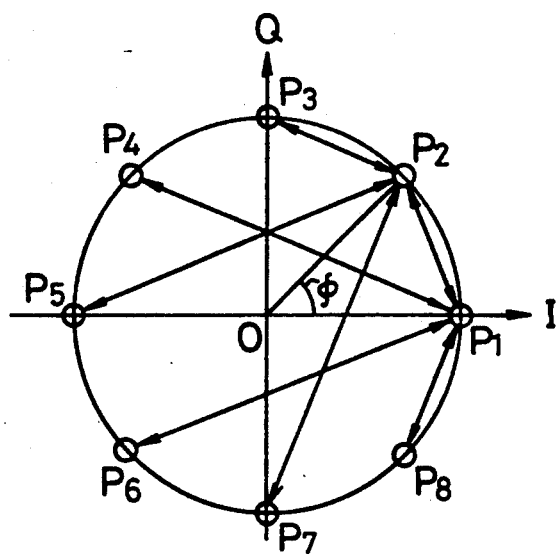
FIGS. 6 and 7 are schematic diagrams used to explain the present invention, respectively.

In the $\pi/4$-shift DQPSK modulation system, as shown in a state transition diagram forming FIG. 6, 8 states are made possible but the state cannot be freely moved from a certain signal point to other signal point. In this case, only four signal points are provided as state transition points. That is, the phase of a modulated wave M, is expressed by the aforementioned equation (1).

In equation (1), $(X_k, Y_k)$ are a symbol pair and a phase change $\Delta \phi$ may be considered as a function of the symbol pair $(X_k, Y_k)$ as shown on the aforenoted table 1.

Figure 7:
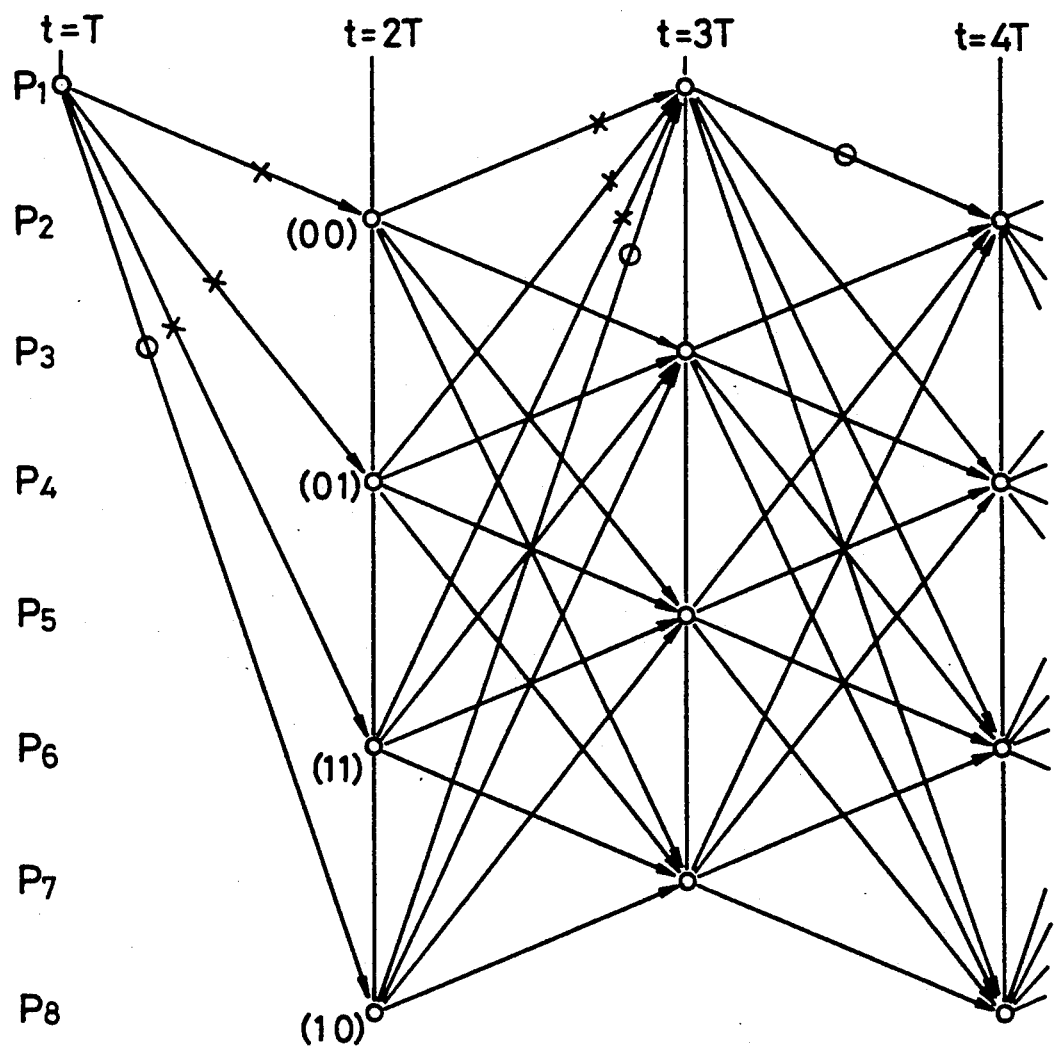

Accordingly, when the shift of phase is detected by the phase rotation amount detecting means 24, a Trellis diagram (i.e., diagram of trace) as shown in FIG. 7 is obtained. Let us now explain operation of this embodiment in the case such that a state transition starts from a signal point $P_1$ at time $t = T$. In this case, it is not necessary to decide a particular starting point and it is known that any starting point raises no problem.

At a time of $t = 3T$, remaining paths are detected, and with respect to the signal point $P_1$ at the time $t = 3T$, paths from signal points of the signal points $P_2$, $P_4$, $P_6$ and $P_8$ may be considered. Accordingly, in order to select one of these four signal points $P_2$, $P_4$, $P_6$ and $P_8$, a path having the maximum likelihood is calculated. Assuming that ($I_2$, $Q_2$) represents a synchronizing detector output at time of t=2T and ($I_3$, $Q_3$) represents a synchronizing detector output at time of t=3T, then a phase shifted amount $\Delta\phi_3$ at that time is expressed as:

$$\Delta\phi_3 = f(I_3, Q_3) - f(I_2, Q_2) \quad (1A)$$

where $f(I_n, Q_n)$ is a phase amount $\phi$ determined by ($I_n$, $Q_n$).

The phase shift amount $\Delta\phi_3$ calculated by the above equation (1A) is compared with those of respective state transitions in $P_2 \rightarrow P_1$, $P_4 \rightarrow P_1$, $P_6 \rightarrow P_1$ and $P_8 \rightarrow P_1$ and, of these phase shift amounts, the phase shift amount of highest probability is left.

That is, the phase shift amount having the following state transitions is maximum in probability:

$P_2 \rightarrow P_1: -\pi/4$, $P_4 \rightarrow P_1: -\frac{3}{4}\pi$, $P_6 \rightarrow P_1: +\frac{3}{4}\pi$, $P_8 \rightarrow P_1: +\frac{1}{4}\pi$. Accordingly, when the remaining paths are selected, then the remaining path having the minimum phase shift amount expressed below is selected by the path selecting circuit 26 in FIG. 5:

$$|\Delta\phi_3 - (-1/4\pi)|, |\Delta\phi_3 - (-3/4\pi)|,$$
$$|\Delta\phi_3 - (-3/4\pi)|, |\Delta\phi_3 - (-1/4\pi)|$$

When $\Delta\phi = +\frac{1}{4}\pi$, for example, $|\Delta\phi_3 - (\frac{1}{4}\pi)|$ becomes minimum. As a consequence, it is determined that the path of $P_8 \rightarrow P_1$ is correct and remains as the remaining path while other paths are cancelled out.

Remaining paths at the signal points $P_3$, $P_6$ and $P_7$ are calculated by sequentially carrying out such calculations.

Then, paths reaching the respective signal points $P_2$, $P_4$, $P_6$ and $P_8$ at time of t=4T are selected and the similar operation is repeated. Then, in this case, four paths exist if $P_1 \rightarrow P_2$, for example, is correct and "metric $M_i$" which shows an added value of "likelihood" of these paths is calculated by the following equation:

$$M_i = \sum_{n=1}^{N} |\Delta\phi_n - \psi_n| \quad (2)$$

The i in the equation (2) is the metric of the remaining path at time of t=NT. Further, $\Delta\phi_n$ represents the phase amount calculated by the aforementioned equation (1A), and $\Psi_n$ represents a predicted amount when the state transition from t=(n−1)·T to t=n·T is carried out. In this case, $\Psi_n$ might be selected from one of $-\frac{1}{4}\pi$, $-\frac{3}{4}\pi$, $+\frac{3}{4}\pi$ and $+\frac{1}{4}\pi$.

In this way, the metric $M_i$ is calculated with respect to four remaining paths and the added values of likelihood are stored in the metric RAMs 31a to 34a. Further, the trace states indicating particular signal points are respectively stored in the trace state memories 31b to 34b provided in correspondence with the metric RAMs 31a to 34a. After a long period of time, the metric values stored in the metric RAMs 31a through 34a are read out and checked by the comparing and selecting circuit 46. Then, a path in which an error is minimized is selected and supplied through the path selecting circuit 47 to the data decoder 48.

There is then a large probability that the path thus selected becomes the path of maximum likelihood, i.e., data having the minimum error rate. According to a certain simulation, it was confirmed that, after a period of time whose duration is as long as several times the constraint length is passed, the remaining paths are merged into a single path. Accordingly, as compared with the prior-art system for determining digital data at every bit, the bit error rate (BER) can be reduced by half, for example.

While the phase rotation amount $\Delta\phi$ is obtained by utilizing the ROM table as described above, the phase rotation amount $\Delta\phi$ may be directly obtained by calculating $\tan^{-1}$ (I, Q).

According to the aforesaid arrangement of the present invention, the phase rotation amounts at the four signal points are calculated from the detected outputs I/Q, the resultant phase rotation amounts are compared with the predetermined phase angle and the likelihoods at the respective signal points are detected on the basis of the compared result to thereby select the remaining paths and data indicating phase errors of the remaining paths are stored during a sufficiently long period of time so that, when the likelihoods of the respective paths are compared, the accumulated errors of sufficiently long period of time can be compared. Accordingly, the accumulated amounts of phase errors of the correct path and incorrect path at respective timing points can be made considerably different. Thus, when one remaining path is selected by comparing the likelihoods of the respective paths, an error in the selection can be avoided and therefore the bit error rate can be improved considerably as compared with that of the prior art in which data is determined at every bit.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A differential phase-shift keying (PSK) signal demodulator comprising:
   (a) a synchronizing detector for synchronizing-detecting a digital modulated signal;
   (b) a detecting signal generating circuit for generating a plurality of detecting signals whose phases are different by a predetermined angle;
   (c) a detection signal selecting circuit for selecting one detecting signal from said detecting signal generating circuit and supplying a selected signal to said synchronizing detector as a symbol detecting signal; and
   (d) a detecting reference axis control circuit for shifting a phase of said detecting signal output from said detecting signal selecting circuit by a predetermined angle each in synchronism with a timing at which a symbol to be detected is supplied.

2. A differential PSK signal demodulator according to claim 1, wherein said synchronizing detector detects an I-axis level signal and a Q-axis level signal and supplies said detected outputs to a gate circuit so that, when said gate circuit derives a predetermined logic output, then said detecting reference axis is set to an initial phase.

3. A differential PSK signal demodulator according to claim 2, wherein the phase of said detecting signal output from said detecting signal selecting circuit is shifted by an angle of $\pi/4$ each.

4. A differential PSK signal demodulator according to claim 1, wherein said detecting signal generating circuit for generating a plurality of detecting signals whose phases are shifted by a predetermined angle is composed of a shift register to which a clock signal is supplied, said detecting reference axis control circuit is composed of a counter which resets said detecting reference axis to an initial phase when said gate circuit derives a predetermined logic output and a selector for selecting an output of said shift register in response to an output of said counter and an output selected by said selector is supplied to said synchronizing detector.

5. A differential phase-shift keying (PSK) signal demodulator comprising:
   (1) phase rotation amount detecting means for detecting a phase rotation amount from an output of an I/Q synchronizing detector;
   (2) a path selecting circuit for selecting a path whose likelihood at a plurality of signal points falls within a predetermined range on the basis of the phase rotation amount output from said phase rotation amount detecting means; and
   (3) a metric storing memory for storing data of said path whose added value of said likelihood at the plurality of signal points falls within a predetermined range, wherein data is demodulated by a read-out output of said metric storing memory.

6. A differential PSK signal demodulator according to claim 5, further comprising a trace state storing memory for storing the path of signal point selected by said path selecting circuit.

* * * * *